United States Patent [19]
Leslie

[11] Patent Number: 6,067,011
[45] Date of Patent: May 23, 2000

[54] ELECTRONIC WARNING SYSTEM

[76] Inventor: Darryl E. Leslie, 4413 James Dr., Chattanooga, Tenn. 37416

[21] Appl. No.: 08/986,730

[22] Filed: Dec. 8, 1997

Related U.S. Application Data

[60] Provisional application No. 60/034,408, Jan. 2, 1997.

[51] Int. Cl.⁷ ................................................. B60Q 1/26
[52] U.S. Cl. .......................... 340/468; 340/471; 340/472; 40/588; 40/590
[58] Field of Search .................................. 340/479, 468, 340/471, 472, 485; 307/10.8; 40/456, 564, 588, 589, 590, 591, 446, 447, 448, 592, 593

[56] References Cited

U.S. PATENT DOCUMENTS

| | | | |
|---|---|---|---|
| 4,094,083 | 6/1978 | Fund | 40/536 |
| 4,446,643 | 5/1984 | Fujita et al. | 40/590 |
| 4,574,269 | 3/1986 | Miller | 340/593 X |
| 4,779,168 | 10/1988 | Montgomery | 362/66 |
| 4,868,542 | 9/1989 | Thompson | 340/468 |
| 4,974,354 | 12/1990 | Hembrook, Jr. | 40/546 |
| 5,053,746 | 10/1991 | Taneo | 340/473 |
| 5,132,666 | 7/1992 | Fahs | 340/472 |
| 5,450,058 | 9/1995 | Collier | 340/473 |
| 5,528,217 | 6/1996 | Adams | 340/435 |

FOREIGN PATENT DOCUMENTS 0537882  4/1993  United Kingdom .

*Primary Examiner*—Daryl Pope
*Attorney, Agent, or Firm*—Richard C. Litman

[57] ABSTRACT

An electronic warning system made up of illuminated and colored placards for trailers carrying hazardous materials. The colored placards are changed as desired to signal different hazardous loads by a computerized control unit located in the cab. The placards are based on display panels of either light emitting diodes or liquid crystal. A remote mobile control unit can also be employed by itself or in conjunction with the cab's control unit to operate at least four colored placards on each side of a trailer to collectively identify the hazardous cargo being transported in compliance with federal regulations.

14 Claims, 5 Drawing Sheets

ELECTRONIC WARNING SYSTEM

CROSS-REFERENCE TO RELATED APPLICATION

This application claims the benefit of U.S. Provisional Patent Application Serial No. 60/034,408, filed Jan. 2, 1997.

BACKGROUND OF THE INVENTION

1. Field of the Invention

The present invention relates to an electronic warning system for commercial trailer vans and, more particularly, to a plurality of electronically controlled hazardous material signs which can selectively display any one of a number of warnings or symbols on a placard, required by the U.S. Department of Transportation to be posted on the exterior of a commercial trailer van while hauling hazardous substances.

2. Description of Relevant Art

When a commercial trailer is used to haul a hazardous material, a sign indicating the hazardous material is required to be placed on all four sides of the trailer. The particular signs used for identifying hazardous materials are mandated by the U.S. Department of Transportation. These signs are in the form of a diamond shaped sign which identifies the substance and the nature of the hazard (i.e., radiation, fire or explosive, etc.) Whenever the contents of the trailer are changed, however, a driver must change the hazardous materials signs present on the trailer. To avoid the need for repeated changing of the hazardous materials signs, it is desirable to provide electronically controlled signs which can display any of the required hazardous materials signs, or any other similar warning signs.

The relevant art describes various means of including warning and advertising signs on particular vehicles, and will be discussed in the order of perceived relevance to the present invention.

U.S. Pat. No. 4,574,269 issued on Mar. 4, 1986, to Gregory R. Miller describes a visual communicator for a rear window of a vehicle. The message display unit is semi-transparent and includes a matrix of light emitting diodes energized by a message control unit. Selected words such as "PASS" and "THANKS" are shown on the message display unit. There is no suggestion to apply this unit to display signs with various colors and designs.

U.S. Pat. No. 4,094,083 issued on Jun. 13, 1978, to Harry Fund describes a vehicle placarding apparatus consisting of imprinted plates hinged to a diamond-shaped base and frame to show a single inscription for hazardous cargo, especially for roll-up rear doors of trailers. The first configuration has only two rectangular plates suitable only for a solid wall. The second configuration has four triangular plates, and is designed only for a roll-up door to fit over two adjacent door segments. These signs are fastened to the walls of the trailer and to the roll-up rear door. There is no suggestion for substituting an integral illuminated diamond for signifying hazardous cargo.

U.S. Pat. No. 4,974,354 issued on Dec. 4, 1990, to Norbert Hembrook, Jr., describes a visual display device for vehicles. A rectangular frame has multiple (five or more) translucent or transparent panels with each panel having cone shaped notches (uncolored) to form letters of a message such as "HELP". The specific printed panel is illuminated from staggered light emitting diodes (LED) or incandescent light bulbs positioned in supports at the top and bottom edges of the rectangular sign. The conductor wires in the horizontal supports can optionally be replaced by a printed circuit board. The specific sign is selected and energized, respectively, by an electrical message control unit located in the cab and the vehicle battery. There is no suggestion for utilizing the LED's or incandescent light bulbs in a single plane for the cone-shaped notches. The present invention utilizes only one panel incorporating the versatility of posting multiple signs.

U.S. Pat. No. 5,450,058 issued on Sep. 12, 1995, to Stanton E. Collier describes a highway deployable directional hazard sign dispensable from the rear of a police vehicle to warn oncoming vehicles of a stopped vehicle. The impact warning device has an elevated light bar consisting of at least six lighting panels which are programmed to either point sequentially to the left or right with arrowheads at the end panels. A battery is provided in the device for energizing the lights and to sound a horn if the sign is impacted. There is no suggestion for either substituting lettered signs or for posting on the sides of a trailer.

European Patent Application No. 0 537 882 A1 published on Apr. 21, 1993, for Courtney B. Bailey describes a mobile or stationary advertising sign having up to five large screens housed in a vehicle and having its own electricity generator and air conditioning system. Video projectors and speaker systems are provided for each translucent screen to create the advertisement. There is no suggestion for providing lettered signs by the use of LED's or the like.

U.S. Pat. No. 4,446,643 issued on May 8, 1984, to Shozo Fujita et al. describes a movable display sign housed in a trailer. The signs are created on lateral surfaces of the trailer by either monochromatic cathode ray tubes or colored light emitting tubes which create a heat build-up within the trailer. The solution is to include a plurality of air conditioners inside the trailer. There is no suggestion for substituting other illuminated devices.

None of the above inventions and patents, taken either singularly or in combination, is seen to describe the instant invention as claimed. Thus, an electronic warning system solving the aforementioned problems is desired.

SUMMARY OF THE INVENTION

The present invention includes a plurality of diamond-shaped electronic signs placed on all four sides of the trailer and controlled by a remote mobile control unit mounted on the outside of a cab and/or a computer console located in the cab. The computer has stored in its memory every new placard of specified dimensions required by the U.S. Department of Transportation for trailers carrying hazardous materials. There are at least 22 different standardized diamond-shaped signs with different warnings, symbols and colors. Since the driver must post the specific sign located on all four sides of the trailer for the particular hazardous load, the selection is quickly made from either the remote mobile unit or the computer console. Thus, the present invention eliminates the tedious posting and changing of various signs. Furthermore, the present invention eliminates the expenses of maintaining a supply of all the necessary hazardous material signs and manually changing said signs.

Accordingly, it is a principal object of the invention to provide selective illuminated hazardous material signs on a commercial trailer by accessing a computerized control from either a remote control unit or a control module unit in the cab.

It is another object of the invention to provide illuminated signs of every hazardous material required by the Department of Transportation.

It is a further object of the invention to provide illuminated signs from liquid crystal flat display panels.

Still another object of the invention is to provide illuminated signs from panels of light emitting diode arrays.

It is an object of the invention to provide improved elements and arrangements thereof in an electronic warning system for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention provides illuminated placards for commercial trailers and a computer console that enables the operator to select the specific hazardous material sign identifying the cargo being transported (the posting of which is required by the U.S. Department of Transportation). Illumination is critical at night and helpful in the daytime to warn other vehicles of the hazardous materials being transported. Of the twenty-two placards required, the background colors in part or in full, vary as follows: six are orange, five are red, four are yellow, five are white, one is green, and one is blue. The lettering can be black or white.

Figure 1:
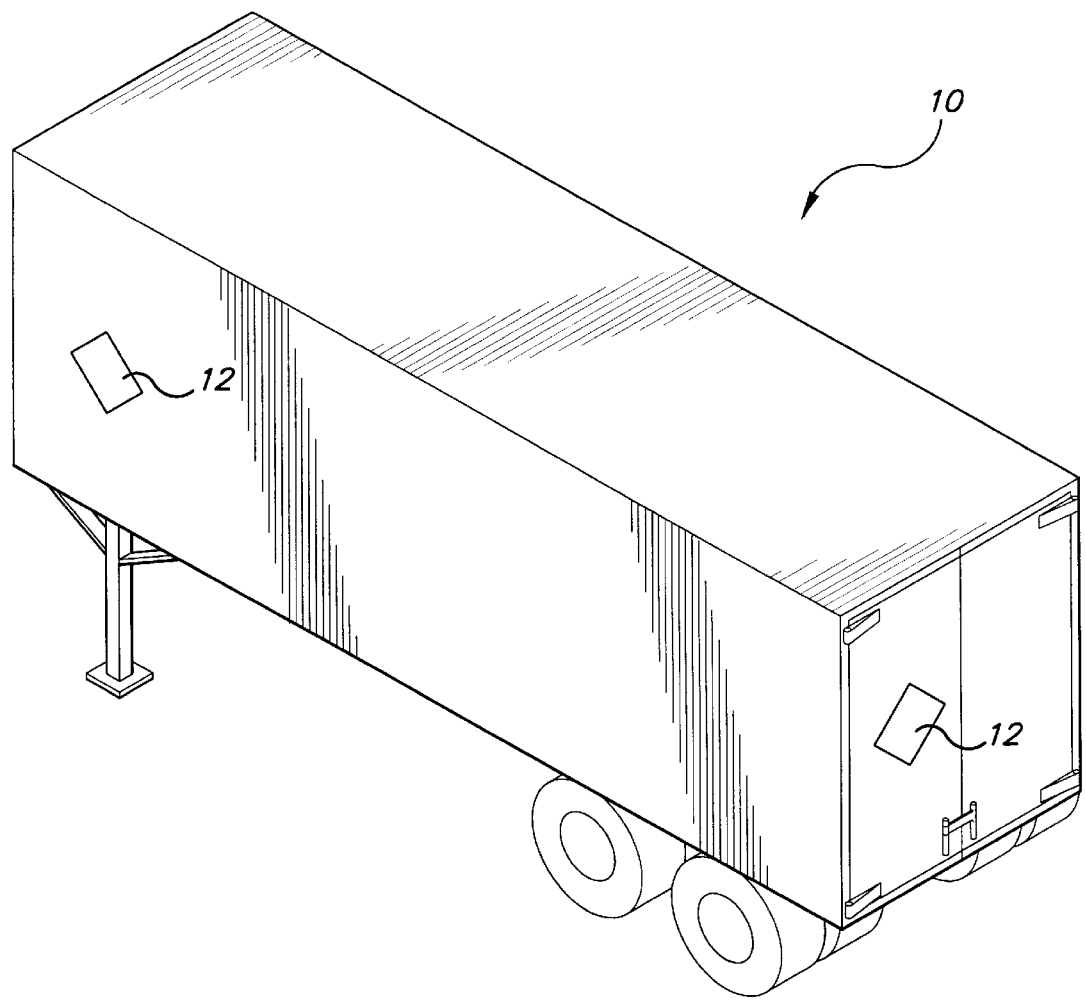
FIG. 1 is an environmental, perspective view of a first embodiment of single illuminated electronic warning placards placed on each side of a commercial trailer according to the present invention.

In FIG. 1, as a first embodiment of single signs on a side, a conventional parked commercial trailer 10 is illustrated with two diamond-shaped hazardous material signs or placards 12. The other two placards on the remaining sides are not visible. The Department of Transportation requires a placard to be at least five feet from the ground on the trailer. The placards 12 are fastened onto the sides of the trailer 10 by any convenient means with an aperture (not shown) for the wiring in the walls of the trailer 10.

Figure 2:
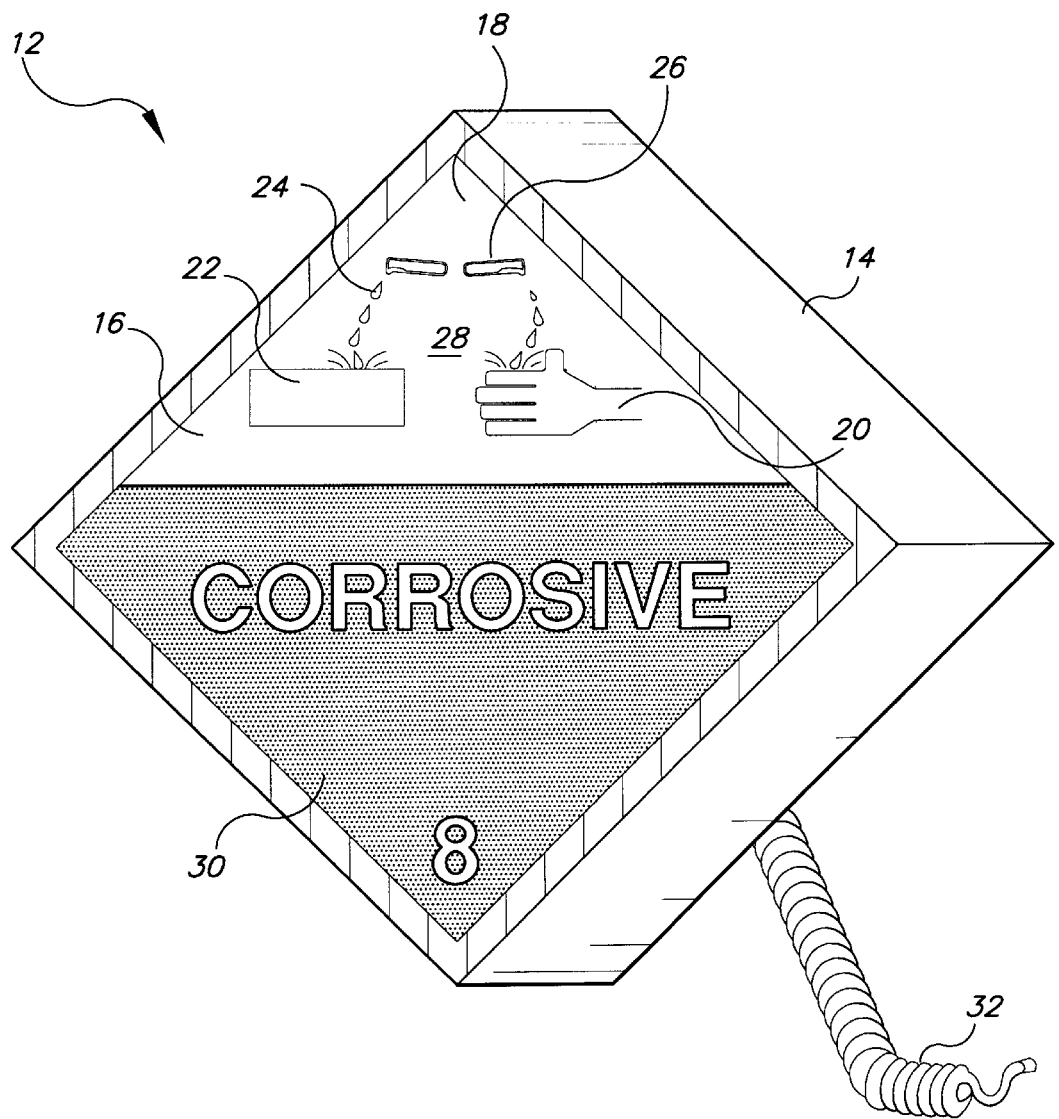
FIG. 2 is a front perspective view of a Class 8 black and white placard with its energizing electric wiring.

FIG. 2 depicts a placard 12 for signifying a Class 8 corrosive material. The diamond-shaped frame 14 has its display panel 16 in black and white as follows. The upper portion 18 has black outlines of a hand 20 and a substrate 22 receiving spilled corrosive materials in the form of drops 24 falling from test tubes 26 against a white background 28. The lower portion 30 covering a greater area than the upper portion 18 has a black background with a white lettered "CORROSIVE" and an "8". An electric current supply cord 32 is shown to energize the illumination of this placard 12. It should be noted that the supply cord 32 as in FIG. 5 is normally inside the trailer 10 to avoid wind resistance.

The display panel 16 can be either a liquid crystal display device for black and white signs such as in this case. There are as many as 250 different colors currently available in liquid crystal displays such as for a lap-top computer. For other colored signs an array of light emitting diodes can be utilized with colors such as red, amber, green, and blue.

Figure 3:
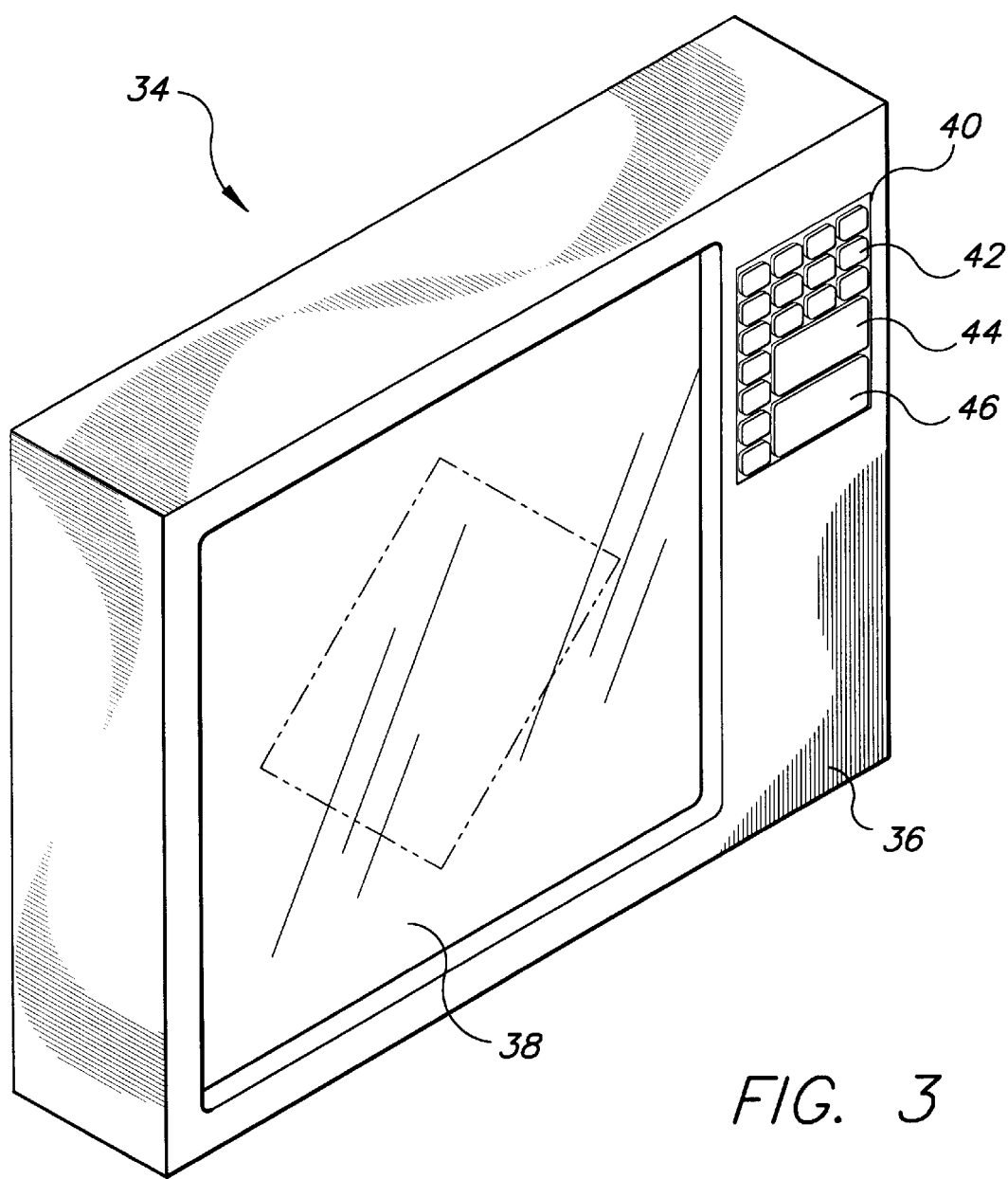
FIG. 3 is a front perspective view of a monitoring control module located in the cab.

FIG. 3 is an exemplary model of a control module unit 34 which is located in the cab. The front face 36 has a monitor (e.g., cathode ray tube) 38 and a control keypad 40 with separate keys 42 for each sign or placard 14 on the trailer 10. Included in the keypad 40 are two large push buttons 44 and 46, respectively, for "on" and "off" control. The intensity of the illumination of the placards 14 can be increased during darkness or inside tunnels i.e., there are at least two levels of illumination contemplated.

Figure 4:
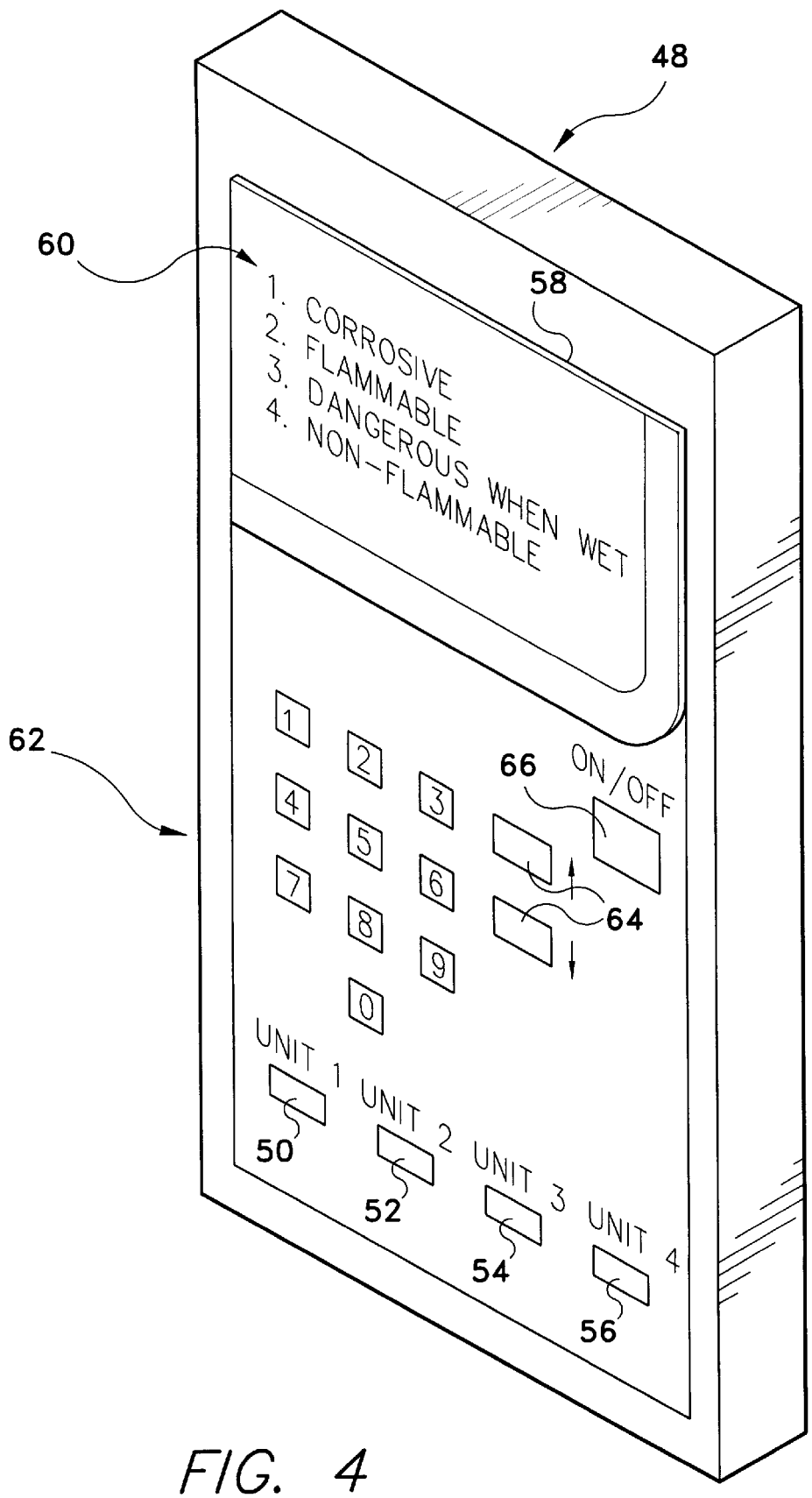
FIG. 4 is a perspective view of a remote control unit of a second embodiment.
Figure 5:
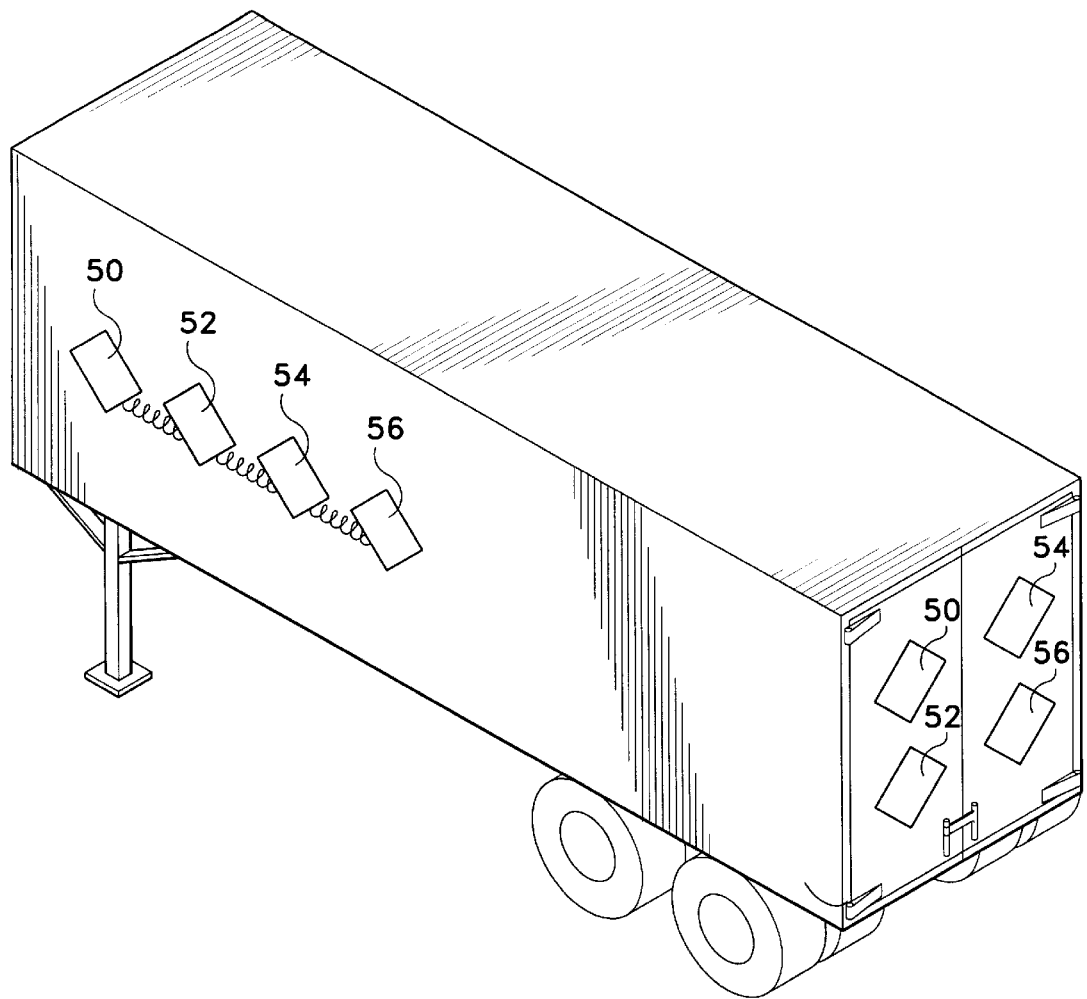
FIG. 5 is an environmental, perspective view of a third embodiment of four illuminated electronic warning placards placed on each trailer side.

As a second embodiment, FIG. 4 depicts a remote mobile control unit 48 for use in designating the specific signs 12 for the four placard units 50, 52, 54, and 56 on each trailer side (only two sides visible) of the third embodiment shown in FIG. 5. The monitor 58 displays at least four itemized and sequentially numbered selections 60 such as "1. CORROSIVE, 2. FLAMMABLE, 3. DANGEROUS WHEN WET, AND 4. NON-FLAMMABLE". Therefore, the placard units 50 to 56 can be utilized to combine and fully describe the hazardous cargo for example as "corrosive, flammable, dangerous when wet", and an "8". The digit keys 62 supply the required numbers if required. The specific placard unit 50 to 56 are designated as units 1 through 4, respectively, on the remote mobile control unit 48. Screen scrolling keys 64 for up and down motion of the list of at least 22 descriptive signs as well as an "on/off" push button switch 66 are available. The remote mobile control unit 48 can be operated alone or in conjunction with the control module unit 34 in the cab. These embodiments illustrated in FIGS. 4 and 5 enable the versatility of outside the cab control of the multiple placard units 50–56 as a double check of the assigned placards while outside the cab and viewing the signs being selected.

Thus, it has been shown that a safe and dependable placard system can be attached to a commercial trailer to enable the versatility of changing the placard colors and messages by a remote control unit and/or a control monitor from the cab with a minimum of difficulty without the time-consuming task of manually chancing the hazardous materials placards.

It is to be understood that the present invention is not limited to the embodiments described above, but encompasses any and all embodiments within the scope of the following claims.

I claim:

1. An electronically illuminated warning sign system for a trailer carrying hazardous materials comprising:

at least one diamond-shaped placard unit comprising a flat display panel being positioned on one of the four sides of a trailer;

an illumination means for illuminating said at least one placard unit;

said at least one placard unit being adapted to display a multi-colored hazardous material sign; and a computerized system for controlling a specific display sign on the at least one placard, whereby various predetermined, and illuminated and colored hazardous material signs can be selected by a driver operating said computerized system;

said computerized system includes a remote mobile control unit and a control module unit affixed inside a cab driving said trailer for selecting a hazardous material sign;

said control module unit includes a monitor for visual confirmation of a selected hazardous sign;

wherein the driver selectively displays an illuminated and colored hazardous material sign on said placard.

2. The warning sign system according to claim 1, said flat display panel being a liquid crystal display panel.

3. The warning sign system according to claim 1, said flat display panel being a light emitting diode array display panel.

4. The warning system according to claim 1, said remote mobile control unit being removably housed on the outside of a tractor cab.

5. The warning sign system according to claim 1, wherein said remote mobile control unit includes a monitor for visual confirmation of a selected hazardous material sign.

6. The warning sign system according to claim 1, wherein said computerized system includes a control module unit located inside a tractor cab and a remote mobile control unit cooperating for selecting a hazardous material sign.

7. The warning sign system according to claim 6, wherein said control module unit and said remote mobile control unit have monitors for selecting a hazardous material sign.

8. The warning sign system according to claim 1, there being at least four diamond-shaped placard units, positioned one on each of the four sides of the trailer.

9. The warning sign system according to claim 6, said remote mobile control unit having a monitor which lists at least four different hazardous material display signs.

10. The warning sign system according to claim 9, said remote mobile control unit having keypads for at least four placard units, whereby each placard unit on a side of said trailer is adapted to be selected simultaneously.

11. The warning sign system according to claim 10, said at least four placard units being combined for displaying and describing one hazardous material.

12. The warning sign system according to claim 1, wherein the computerized system includes provision for at least two levels of the illumination means for increasing the intensity of the illumination during darkness or inside tunnels.

13. A method of warning other vehicles of hazardous cargo being carried by a commercial trailer comprising;

providing an electronically illuminated warning system on four sides of a commercial trailer by placing diamond-shaped placards on each side, the placards being flat panel displays;

providing a computerized system including a remote mobile control unit and a monitor for controlling the placards to signal signs for the carrying of hazardous materials;

changing the signs for each different hazardous material being carried in the trailer by selecting a hazardous material sign stored in the computerized system by utilizing the mobile control unit; and visually confirming a hazardous material sign selection by observing the monitor.

14. The method according to claim 13, wherein the electronically illuminated warning system is provided with at least two levels of illumination for increasing the intensity of the illumination during darkness or inside tunnels.

* * * * *